United States Patent
Spangler

(10) Patent No.: US 9,254,470 B1
(45) Date of Patent: Feb. 9, 2016

(54) SEGMENTED LINER AND TRANSITION SUPPORT RING FOR USE IN A FLUIDIZED BED REACTOR

(71) Applicant: REC Silicon Inc, Moses Lake, WA (US)

(72) Inventor: Michael V. Spangler, Soap Lake, WA (US)

(73) Assignee: REC Silicon Inc, Moses Lake, WA (US)

( * ) Notice: Subject to any disclaimer, the term of this patent is extended or adjusted under 35 U.S.C. 154(b) by 0 days.

(21) Appl. No.: 14/512,308

(22) Filed: Oct. 10, 2014

(51) Int. Cl.
| | |
|---|---|
| *B01J 8/18* | (2006.01) |
| *B01J 8/00* | (2006.01) |
| *B01J 8/24* | (2006.01) |
| *B01J 19/00* | (2006.01) |
| *B01J 19/24* | (2006.01) |
| *C23C 16/06* | (2006.01) |
| *C23C 16/22* | (2006.01) |
| *C23C 16/24* | (2006.01) |
| *C23C 16/44* | (2006.01) |
| *C23C 16/442* | (2006.01) |
| *C23C 16/455* | (2006.01) |

(52) U.S. Cl.
CPC .. *B01J 8/24* (2013.01); *B01J 8/008* (2013.01); *B01J 8/0015* (2013.01); *B01J 8/1818* (2013.01); *B01J 8/1836* (2013.01); *B01J 2208/0061* (2013.01); *B01J 2208/00761* (2013.01); *B01J 2208/00893* (2013.01)

(58) Field of Classification Search
CPC ............ B01J 8/00; B01J 8/0015; B01J 8/008; B01J 8/18; B01J 8/1818; B01J 8/1836; B01J 9/00; B01J 9/24; B01J 2208/00008; B01J 2208/0061; B01J 2208/00761; B01J 2208/00893; C23C 16/06; C23C 16/22; C23C 16/24; C23C 16/44; C23C 16/442; C23C 16/455

See application file for complete search history.

(56) References Cited

U.S. PATENT DOCUMENTS

| | | |
|---|---|---|
| 5,447,683 A | 9/1995 | Montgomery et al. |
| 8,075,692 B2 | 12/2011 | Osborne et al. |
| 8,590,770 B2 | 11/2013 | Chaumat et al. |
| 8,678,269 B2 | 3/2014 | Chaumat et al. |
| 2006/0162849 A1 | 7/2006 | Han |
| 2011/0033018 A1 | 2/2011 | Peterson et al. |
| 2011/0033717 A1 | 2/2011 | Peterson et al. |
| 2011/0117729 A1 | 5/2011 | Osborne et al. |
| 2011/0203101 A1 | 8/2011 | Gum et al. |
| 2012/0082592 A1 | 4/2012 | Jung et al. |

(Continued)

FOREIGN PATENT DOCUMENTS

| | | |
|---|---|---|
| WO | WO 2014035878 | 3/2014 |
| WO | WO 2014-099502 A1 | 6/2014 |

OTHER PUBLICATIONS

International Search Report and Written Opinion issued by Korean Intellectual Property Office on Jun. 30, 2015, for International Patent Application No. PCT/US2014/070639, 7pp.

(Continued)

*Primary Examiner* — Natasha Young
(74) *Attorney, Agent, or Firm* — Klarquist Sparkman, LLP

(57) ABSTRACT

Transition support rings for joining tubular segments of different inner cross-sectional dimensions to make segmented liners for use in a fluidized bed reactor (FBR) for making polysilicon-coated granulate material are disclosed. Segmented liners comprising the transition support rings and fluidized bed reactors including segmented liners are also disclosed.

20 Claims, 5 Drawing Sheets

(56) References Cited

U.S. PATENT DOCUMENTS

| | | |
|---|---|---|
| 2013/0064602 A1 | 3/2013 | Chaumat et al. |
| 2014/0123896 A1 | 5/2014 | Miller et al. |
| 2015/0017787 A1 | 1/2015 | Miller et al. |

OTHER PUBLICATIONS

Aremco Products, Inc., "*High Temperature Ceramic & Graphite Adhesives,*" Technical Bulletin A2, (6 pgs), Feb. 2013.

Reparex, "*Flow Pro-Tech Liners: wear resistant elbow lining systems*" (2 pgs), Apr. 2003.

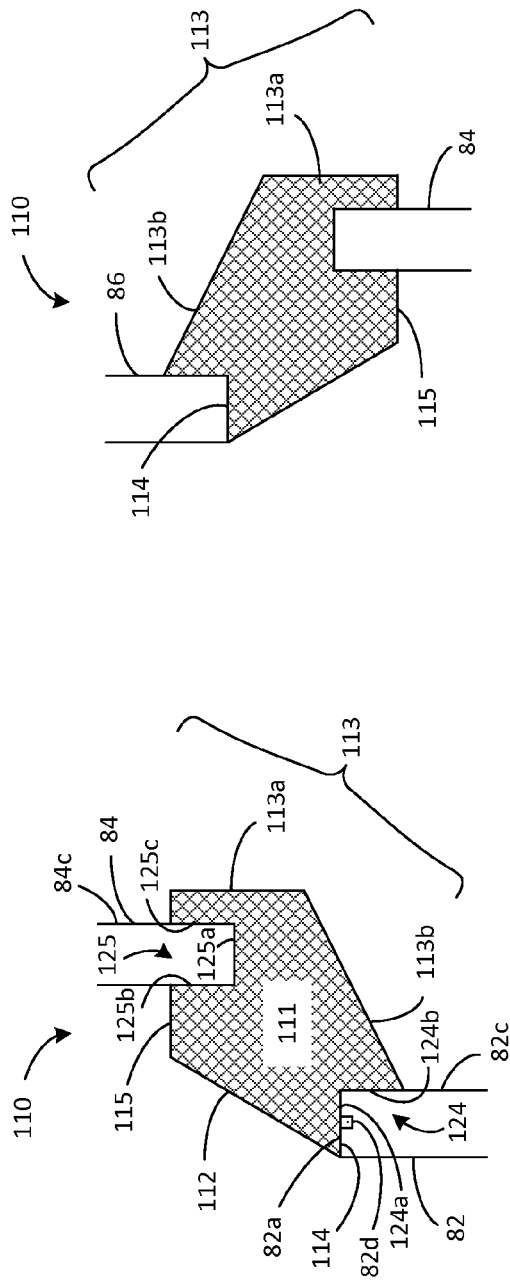
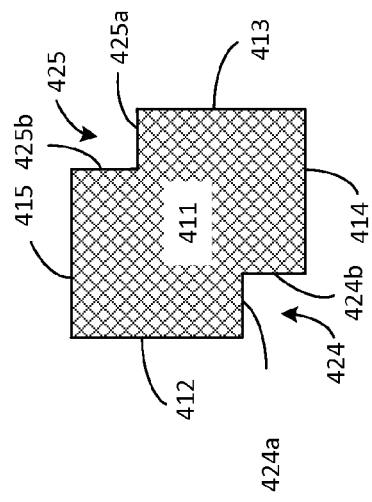

SEGMENTED LINER AND TRANSITION SUPPORT RING FOR USE IN A FLUIDIZED BED REACTOR

FIELD

This disclosure concerns joining tubular segments to make segmented liners for use in a fluidized bed reactor for making polysilicon-coated granulate material.

BACKGROUND

Pyrolytic decomposition of silicon-bearing gas in fluidized beds is an attractive process for producing polysilicon-coated granular material, such as polysilicon or polysilicon-coated germanium, due to excellent mass and heat transfer, increased surface for deposition, and continuous production. An issue in many fluidized bed reactors is the formation of large bubbles within the bed in the main reaction zone under certain conditions.

An unwanted effect of large bubbles, particularly in gas-solid systems, is that they can cause the bed to bounce violently up and down as they lift a significant fraction of the bed, then drop it suddenly. This pressure oscillation can interfere with proper operation of the bed by causing the gas velocity rate to vary, which may be harmful to optimum productivity. The pressure oscillation also causes mechanical stress to the reactor structure and any directly connected support equipment. Furthermore, large bubbles can cause the bed material to surge upward in the reactor in a phenomenon known as "slugging." Slugging can cause ejection of at least a portion of the bed from the reactor or damage internal reactor components.

Slugging is a significant problem when bubbles reach a diameter close to the inner cross-sectional dimension of the reaction chamber. Varying the diameter of fluidized bed reactor's reaction chamber such that a narrower section is included in the reaction zone tends to reduce the amount of slugging in the fluidized bed. The varying inner cross-sectional dimensions affect the velocity of upward gas flow in the reaction chamber. A first velocity at the point of gas introduction produces bubbles having a first average size, while a second, different velocity higher up in the reaction chamber favors bubbles having a second average size. The inner cross-sectional dimension of the reaction chamber can be varied over its length to prevent or minimize the occurrence of bubbles having a size sufficient to disrupt fluidization, which may result in slugging that ejects at least a portion of the bed from the reactor and/or damages internal reactor components. A liner of varying inner cross-sectional dimension can be formed by joining liner segments of differing inner cross-sectional dimensions and inserted into the FBR reaction chamber to reduce slugging. However, a need exists for a component suitable for joining the liner segments to produce the liner.

SUMMARY

This disclosure concerns embodiments of a transition support ring for joining tubular segments to make segmented liners for use in a fluidized bed reactor (FBR) for making polysilicon-coated granulate material. The transition support ring comprises an annular body having a surface that defines an upwardly opening annular hollow that is sized and shaped to partially receive a segment of a liner of a fluidized bed reactor for production of polysilicon-coated granulate material, and a downwardly opening annular hollow that is sized and shaped to partially receive a segment of a liner of a fluidized bed reactor for production of polysilicon-coated granulate material, the upwardly opening annular hollow being spaced radially from the downwardly opening annular hollow such that the upwardly opening annular hollow and the downwardly opening annular hollow are capable of receiving liner segments having different inner cross-sectional dimensions.

In some embodiments, the annular body has an upper surface that defines the upwardly opening annular hollow, and a lower surface that defines the downwardly opening annular hollow. In any or all of the above embodiments, the upper surface may include a generally horizontal floor surface that partially defines the upwardly opening hollow and that is configured to support a liner segment, and the lower surface includes generally horizontal ceiling surface that partially defines the downwardly opening hollow and that is configured to rest on a liner segment. In any or all of the above embodiments, the upper surface may include at least one side surface that partially defines the upwardly opening hollow, and the lower surface may include at least one side surface that partially defines the downwardly opening hollow, with all of the side surfaces extending generally vertically.

In any or all of the above embodiments, the annular body may comprise a metal, a metal alloy, a ceramic, or a ceramic matrix composite. In some embodiment, the annular body comprises 304H or 304L stainless steel, a cobalt alloy, an iron-chromium-nickel-molybdenum alloy, an iron-nickel alloy, a nickel-chromium alloy, a nickel-based or cobalt-based superalloy, silicon carbide, silicon nitride, reaction-bonded silicon carbide, or a ceramic matrix composite. In one embodiment, the ceramic matrix composite comprises SiC, $Si_3N_4$, reaction-bonded SiC, or internal fibers comprising alumina and an outer coating comprising SiC, $Si_3N_4$, or reaction-bonded SiC.

In any or all of the above embodiments, at least a portion of the surface of the annular body may be coated with an outer protective layer comprising a cobalt-based alloy, a nickel-based alloy, a cobalt-based superalloy, a nickel-based superalloy, silicon carbide, silicon nitride, tungsten carbide, or a combination thereof. In one embodiment, the outer protective layer has an ultimate tensile strength of at least 700 MPa at 650° C. In an independent embodiment, the outer protective layer has a linear coefficient of thermal expansion that differs by ≤30% from a linear coefficient of thermal expansion of the ring. In any or all of the foregoing embodiments, an intermediate bonding layer may be disposed between the surface of the annular body and the outer protective layer.

Embodiments of a tubular segmented liner include (i) a tubular first liner segment having an upper edge surface with a first inner cross-sectional dimension; (ii) a tubular second liner segment vertically stacked on the first liner segment, the second liner segment having an upper edge surface and a lower edge surface, the lower edge surface having a second inner cross-sectional dimension that is different than the first inner cross-sectional dimension; and (iii) a transition support ring positioned between the upper edge surface of the first liner segment and the lower edge surface of the second liner segment. In one embodiment, the first liner segment and the second liner segment are constructed of the same material. In another embodiment, the first liner segment and the second liner segment are constructed of different materials. In any or all of the above embodiments, the first and second liner segments independently may have a linear coefficient of thermal expansion that differs by ≤30% from a linear coefficient of thermal expansion of the transition support ring.

In any or all of the above embodiments, at least one of the first liner segment and the second liner segment comprises a plurality of laterally joined segment portions. In some embodiments, the segment portions comprise silicon carbide, and the segmented liner further includes a cured bonding material disposed between adjacent segment portions, the cured bonding material comprising 0.4-0.7 wt % lithium as lithium aluminum silicate and 93-97 wt % silicon carbide.

In any or all of the above embodiments, the segmented liner may further include a tubular third liner segment vertically stacked on the second liner segment, the third liner segment having a lower edge surface with a third inner cross-sectional dimension that is different than the second inner cross-sectional dimension, and a second transition support ring positioned between the upper edge surface of the second liner segment and the lower edge surface of the third liner segment.

A fluidized bed reactor for production of polysilicon-coated granulate material includes (i) a vessel having an outer wall; and (ii) a tubular segmented liner comprising a tubular first liner segment having an upper edge surface with a first inner cross-sectional dimension, a tubular second liner segment vertically stacked on the first liner segment, the second liner segment having a lower edge surface with a second inner cross-sectional dimension that is different than the first inner cross-sectional dimension, and a transition support ring positioned between the upper edge surface of the first liner segment and the lower edge surface of the second liner segment, the liner being positioned inwardly of the outer wall such that the inner surfaces of the liner segments define a portion of a reaction chamber. In some embodiments, the fluidized bed reactor further includes at least one heater positioned between the outer wall and the tubular segmented liner, at least one inlet having an opening positioned to admit a primary gas comprising a silicon-bearing gas into the reaction chamber, a plurality of fluidization gas inlets, wherein each fluidization gas inlet has an outlet opening into the reaction chamber, and at least one outlet for removing silicon-coated product particles from the vessel.

The foregoing and other features and advantages will become more apparent from the following detailed description, which proceeds with reference to the accompanying figures.

BRIEF DESCRIPTION OF THE DRAWINGS

FIG. 3A is a schematic partial radial cross-sectional elevational view taken along line 3A-3A of FIG. 2B.

FIG. 3B is a schematic partial radial cross-sectional elevational view taken along line 3B-3B of FIG. 2B.

FIGS. 4-6 are partial radial schematic cross-sectional elevational views of other embodiments of transition support rings.

DETAILED DESCRIPTION

Figure 1:
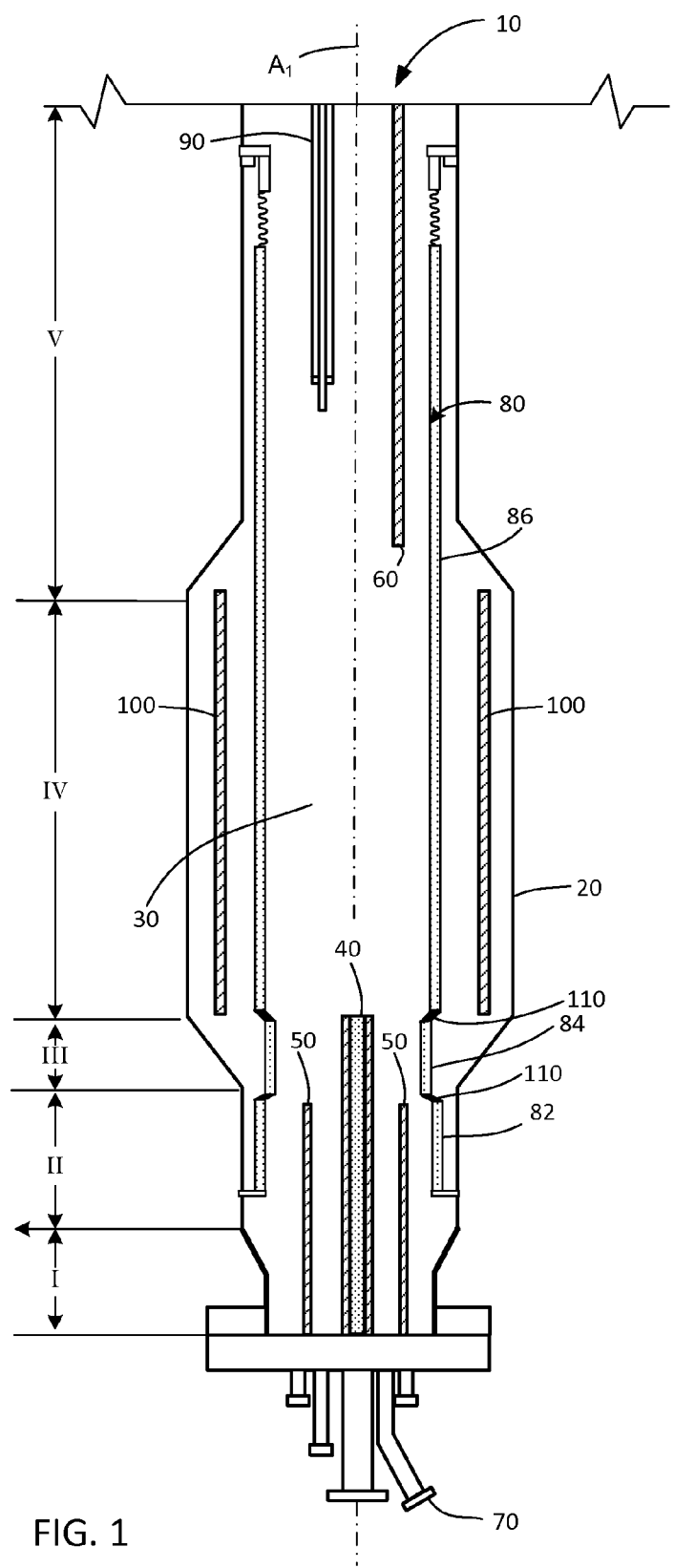
FIG. 1 is a schematic cross-sectional elevational view of a fluidized bed reactor.

This disclosure concerns embodiments of a transition support ring for joining tubular segments to make segmented liners for use in a fluidized bed reactor (FBR) for making polysilicon-coated granulate material. The segments may have differing inner cross-sectional dimensions that are selected to minimize formation of large bubbles during FBR operation.

I. Definitions and Abbreviations

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, percentages, temperatures, times, and so forth, as used in the specification or claims are to be understood as being modified by the term "about." Accordingly, unless otherwise indicated, implicitly or explicitly, the numerical parameters set forth are approximations that may depend on the desired properties sought, limits of detection under standard test conditions/methods, or both. When directly and explicitly distinguishing embodiments from discussed prior art, the embodiment numbers are not approximates unless the word "about" is recited.

Unless otherwise indicated, all percentages referring to a composition or material are understood to be a percent by weight, i.e., % (w/w). For example, a composition comprising 2% lithium includes 2 g lithium per 100 g of the composition. Where expressly noted, percentages referring to a substance may be atomic percentages, i.e., the number of atoms per 100 atoms. For example, a substance comprising 1% atomic phosphorus includes one phosphorus atom per one hundred atoms in the substance. Similarly, concentrations expressed as parts per million (ppm) or parts per billion (ppb) are understood to be in terms of weight unless otherwise indicated, e.g., 1 ppm=1 mg/kg. Where expressly noted, concentrations may be expressed as ppma (ppm atomic) or ppba, e.g., 1 ppma=1 atom in 1,000,000 atoms.

In order to facilitate review of the various embodiments of the disclosure, the following explanations of specific terms are provided:

Acceptor: An atom capable of accepting an electron (p-type dopants), thus generating holes in the valence band of silicon atoms; acceptors include Group III elements, such as B, Al, Ga, also Be, Sc.

Atomic percent: The percent of atoms in a substance, i.e., the number of atoms of a particular element per 100 atoms of the substance.

Donor: An atom capable of donating an electron to serve as a charge carrier in the valence band of silicon atoms (n-type dopants) donors include Group V elements, such as N, P, As; also Ti, Cr, Sb.

Dopant: An impurity introduced into a substance to modulate its properties; acceptor and donor elements replace elements in the crystal lattice of a material, e.g., a semiconductor.

Electronic-grade silicon: Electronic-grade, or semiconductor-grade, silicon has a purity of at least 99.99999 wt %, such as a purity from 99.9999-99.9999999 wt % silicon. Electronic-grade silicon typically includes ≤0.3 ppba B, ≤0.3 ppba P, ≤0.5 ppma C, <50 ppba bulk metals (e.g., Ti, Cr, Fe, Ni, Cu, Zn, Mo, Na, K, Ca), ≤20 ppbw surface metals, ≤8 ppbw Cr, ≤8 ppbw Ni, ≤8 ppba Na. In some instances, electronic-grade silicon includes ≤0.15 ppba B, ≤0.15 ppba P, ≤0.4 ppma C, ≤10 ppbw bulk metals, ≤0.8 ppbw surface metals, ≤0.2 ppbw Cr, ≤0.2 ppbw Ni, ≤0.2 ppba Na.

Foreign metal: As used herein, the term "foreign metal" refers to any metal present in silicon carbide, other than silicon.

LCTE: Linear coefficient of thermal expansion, a measure of the fractional change in length of a material per degree of temperature change.

Mobile metal: As used herein, the term "mobile metal" refers to a metal atom or metal ion that may migrate out of a substance (e.g., out of silicon carbide) or vaporize at operating conditions of a fluidized bed reactor and contribute to product contamination. Mobile metals include Group IA metals, Group IIA metals, Group IIIA metals, transition metals, and cations thereof.

Reaction-bonded silicon carbide (RBSiC): Reaction-bonded silicon carbide may be produced by reacting porous carbon or graphite with molten silicon. Alternatively, RBSiC may be formed by exposing a finely divided mixture of silicon carbide and carbon particles to liquid or vaporized silicon at high temperatures whereby the silicon reacts with the carbon to form additional silicon carbide, which bonds the original silicon carbide particles together. RBSiC often contains a molar excess of unreacted silicon, which fills spaces between silicon carbide particles, and may be referred to as "siliconized silicon carbide." In some processes, a plasticizer may be used during the manufacturing process and subsequently burned off.

Solar-grade silicon: Silicon having a purity of at least 99.999 wt % atomic. Furthermore, solar-grade silicon typically has specified concentrations of elements that affect solar performance. According to Semiconductor Equipment and Materials International (SEMI) standard PV017-0611, solar-grade silicon may be designated as grade I-IV. For example, Grade IV solar-grade silicon contains <1000 ppba acceptors (B, Al), <720 ppba donors (P, As, Sb), <100 ppma carbon, <200 ppba transition metals (Ti, Cr, Fe, Ni, Cu, Zn, Mo), and <4000 ppba alkali and earth alkali metals (Na, K, Ca). Grade I solar-grade silicon contains <1 ppba acceptors, <1 ppba donors, <0.3 ppma C, <10 ppba transition metals, and <10 ppba alkali and earth alkali metals.

Superalloy: As used herein, the term "superalloy" refers to a nickel- or cobalt-based alloy with a face-centered cubic (austenitic) structure.

Surface contamination: Surface contamination refers to contamination (i.e., undesired elements, ions, or compounds) within surface layers of a material, such as a silicon carbide segment. Surface layers include the outermost atomic or molecular layer of the material as well as atomic/molecular layers extending inwardly to a depth of 25 μm in the material. Surface contamination may be determined by any suitable method including, but not limited to, scanning electron microscopy, energy dispersive x-ray spectroscopy, or secondary ion mass spectrometry.

II. Fluidized Bed Reactor

FIG. 1 is a simplified schematic diagram of a fluidized bed reactor 10 for producing silicon-coated particles. The reactor 10 extends generally vertically, has an outer wall 20, a central axis $A_1$, and may have cross-sectional dimensions that are different at different elevations. The reactor shown in FIG. 1 has five regions, I-V, of differing cross-sectional dimensions at various elevations.

Silicon-coated particles are grown by pyrolytic decomposition of a silicon-bearing gas within a reactor chamber 30 and deposition of silicon onto particles within a fluidized bed. One or more inlet tubes 40 are provided to admit a primary gas, e.g., a silicon-bearing gas or a mixture of silicon-bearing gas, hydrogen and/or an inert gas (e.g., helium, argon) into the reactor chamber 30. The reactor 10 further includes one or more fluidization gas inlet tubes 50. Additional hydrogen and/or inert gas can be delivered into the reactor through fluidization inlet tube(s) 50 to provide sufficient gas flow to fluidize the particles within the reactor bed. At the outset of production and during normal operations, seed particles are introduced into reactor 10 through a seed inlet tube 60. Silicon-coated particles are harvested by removal from reactor 10 through one or more product outlet tubes 70.

A liner 80 may extend vertically through the reactor 10. In some arrangements, the liner is concentric with the reactor wall 20. The liner 80 may comprise segments of different cross-sectional dimensions, particularly different inner cross-sectional dimensions, which cause the upward flow of gas through the reactor to be at different velocities at different elevations. In the exemplary reactor 10 of FIG. 1, the liner 80 includes three vertically stacked segments 82, 84, 86. Each of the segments is tubular, in particular, generally a right circular cylinder in shape. The middle segment 84 has a smaller horizontal cross-sectional dimension than lower and upper segments 82, 86. Transition support rings 110 are positioned between adjacent segments, e.g., between segments 82 and 84, and between segments 84 and 86. A first transition support ring 110 prevents the smaller middle segment 84 from slipping into the larger lower segment 82. A second transition support ring 110 prevents the larger upper segment 86 from slipping down over the middle segment 84.

In some embodiments, a probe assembly 90 extends into the reactor chamber 30. The reactor 10 further includes one or more heaters. In some embodiments, the reactor includes a circular array of heaters 100 located concentrically around reactor chamber 30 between liner 80 and outer wall 20. In some systems, a plurality of radiant heaters 100 is utilized with the heaters 100 spaced equidistant from one another.

The temperature in the reactor differs in various portions of the reactor. For example, when operating with silane, $SiH_4$, as the silicon-containing compound from which silicon is to be released in the manufacture of polysilicon particles, the temperature in region I, i.e., the bottom zone, is ambient temperature to 100° C. (FIG. 1). In region II, i.e., the cooling zone, the temperature typically ranges from 50-700° C. In region III, the intermediate zone, the temperature is substantially the same as in region IV. The central portion of region IV, i.e., the reaction and splash zone, is maintained at 620-760° C., and advantageously at 660-690° C., with the temperature increasing to 700-900° C. near the walls of region IV, i.e., the radiant zone. The upper portion of region V, i.e., the quench zone, has a temperature of 400-450° C.

Polysilicon-coated granulate particles are produced by flowing a silicon-containing gas through the fluidized bed reactor containing a seed particle within the reactor chamber under conditions sufficient to effect pyrolysis of the silicon-containing gas and deposition of a polycrystalline silicon layer on the seed particle to form a polysilicon-coated particle.

III. Transition Support Rings

Figure 2B:
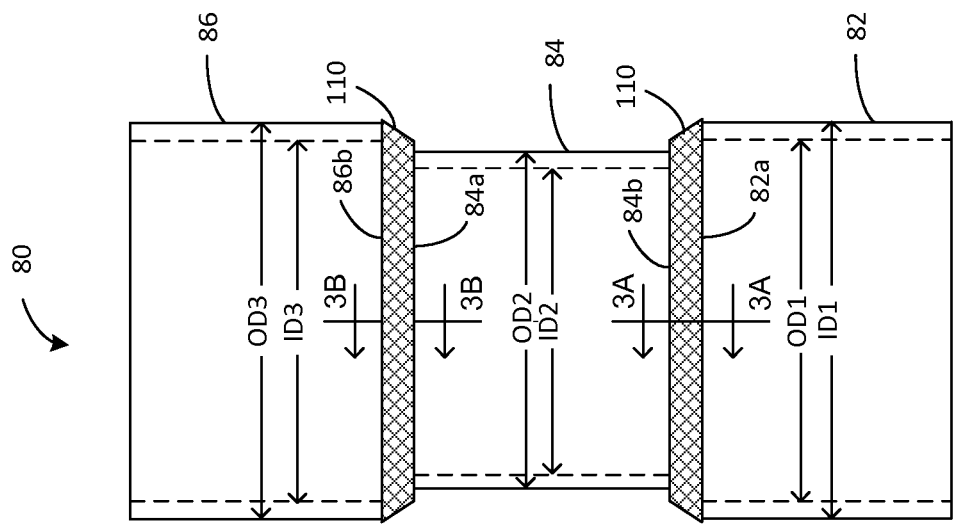
FIG. 2B is a schematic elevational view of an exemplary segmented liner including three stacked segments with at least one of the segments having different horizontal cross-sectional dimensions than the others and a transition support ring between each pair of adjacent stacked segments.
Figure 2A:
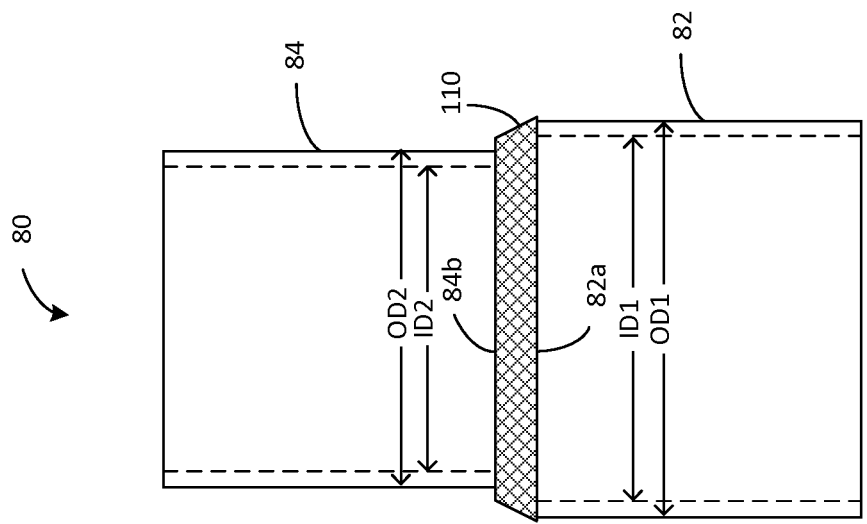
FIG. 2A is a schematic elevational view of an exemplary segmented liner including two stacked segments having different horizontal cross-sectional dimensions and a transition support ring between the stacked segments.

With reference to FIGS. 2A and 3A, a transition support ring 110 is used to join two vertically stacked tubular liner segments 82, 84 that have inner and outer surfaces that are right circular cylinders. The segments 82, 84 have different inner cross-sectional dimensions (ID1 and ID2, respectively) and are joined to form a liner 80 of varying inner cross-sectional dimension. In the embodiment illustrated in FIG. 2A, the inner cross-sectional dimension ID1 of the upper edge 82a of liner segment 82 is greater than the inner cross-sectional dimension ID2 of the lower edge 84b of liner segment 84. When the segments 82, 84 have substantially similar wall thicknesses, the segments also will have different outer cross-sectional dimensions OD1, OD2, respectively. Transition support ring 110 has an annular body 111 having an outward facing surface 112, an inward facing surface 113, a lower surface 114 and an upper surface 115. The inward facing surface 113 includes a vertical portion 113a and an angled portion 113b that extends downwardly and outwardly from the vertical portion 113a when viewed in radial cross-section as shown in FIG. 3A. The angled surface portion 113b flares downwardly from the annular surface portion 113a. The angled surface portion 113b advantageously may facilitate upward gas flow and maintenance of fluidization in the fluidized portions of the FBR. The lower surface 114 comprises a downwardly facing ceiling surface 124a and at least one side surface 124b that together define a downwardly opening hollow 124. The upper surface 115 comprises a floor surface or seat 125a and at least one side surface 125b that together define an upwardly opening hollow 125. When the upwardly opening hollow 125 has two vertical sides 125b, 125c as shown in FIG. 3A, the upwardly opening hollow 125 is an upwardly opening annular groove or channel defined by the floor surface 125a and vertical sides 125b, 125c. The downwardly opening hollow 124 is spaced radially from the upwardly opening hollow 125 such that the downwardly opening annular hollow 124 and the upwardly opening annular hollow 125 are capable of receiving liner segments having different inner cross-sectional dimensions. In particular, side surface 124b is spaced radially from side surface 125c such that the inward facing surface 82c of liner segment 82 is spaced radially from the inward facing surface 84c of liner segment 84. The downwardly opening hollow 124 is an annular rabbet that is sized and shaped to partially receive a liner segment 82 having an upper edge surface 82a. The upwardly opening hollow 125 is sized and shaped to partially receive a liner segment 84 having a lower edge surface 84b in the manner of a tongue-and-groove joint. The ceiling surface 124a of the downwardly opening hollow 124 and floor surface 125a of the upwardly opening hollow 125 are generally horizontal, when the transition support ring 110 is positioned between two vertically stacked liner segments 82, 84. In some embodiments, the side surfaces 124b, 124c and 125b of the downwardly and upwardly opening hollows 124, 125 are parallel, or substantially parallel, to one another when viewed in radial cross-section as shown in FIG. 3A. In certain arrangements, the side surfaces 124b, 125b, 125c are vertical, or substantially vertical, when the transition support ring 110 is positioned between two vertically stacked liner segments 82, 84.

A person of ordinary skill in the art understands that, when a liner segment has a smaller cross-sectional dimension than an adjacent liner segment stacked vertically above it, the transition support ring 110 may be rotated 180° about a horizontal axis such that the upper surface 115 faces downward and the lower surface 114 faces upward and is the surface of a ledge (FIG. 3B). When rotated, the angled portion 113b of the inward facing surface 113 advantageously may prevent, or minimize, collection of polysilicon-coated particles on the surface and may facilitate return of particles to lower portions of the FBR. The rotated orientation is also illustrated in FIGS. 1 and 2B where an inverted transition support ring 110 is positioned between the upper edge surface 84a of liner segment 84 and the lower edge surface 86b of liner segment 86, in which the inner cross-sectional dimension ID2 of the upper edge surface 84a of liner segment 84 is less than the inner cross-sectional dimension ID3 of the lower edge surface 86b liner segment 86. In the embodiment shown in FIG. 2B, the outer cross-sectional dimension OD2 of liner segment 84 is also less than the outer cross-sectional dimension OD3 of the lower edge surface 86b liner 86. The inner cross-sectional dimensions ID1, ID3 of the upper edge surface 82a of liner segment 82 and the lower edge surface 86b of liner segment 86, respectively, may be the same or different.

FIG. 4 is a radial cross-sectional elevational view of a transition support ring 410. Transition support ring 410 comprises annular body 411 having an outward facing surface 412, an inward facing surface 413, a lower surface 414 and an upper surface 415. The lower surface 414 comprises a ceiling surface 424a and a side surface 424b that together define a downwardly opening hollow 424 that is an annular rabbet. The upper surface 415 comprises a floor surface or seat 425a that is the surface of a ledge and at least one side surface 425b. The floor surface 425a and side surface 425b together define an upwardly opening hollow 425. The downwardly opening hollow 424 is spaced radially from the upwardly opening hollow 425 that is an annular rabbet. In particular side surface 424b is spaced radially from inward facing surface 413. The outward facing surface 412 and inward facing surface 413 of transition support ring 410 are parallel to one another when viewed in radial cross-section as shown in FIG. 4, and are vertical, or substantially vertical, when the transition support ring 410 is positioned between two vertically stacked liner segments (not shown). The ceiling surface 424a of the downwardly opening hollow 424 and floor surface 425a of the upwardly opening hollow 425 are generally horizontal, when the transition support ring 410 is positioned between two vertically stacked liner segments. In some embodiments, the side surfaces 424b and 425b of the downwardly and upwardly opening hollows 424, 425 are parallel, or substantially parallel, to one another when viewed in radial cross-section as shown in FIG. 4. In certain arrangements, the side surfaces 424b, 425b are vertical, or substantially vertical, when the transition support ring 410 is positioned between two vertically stacked liner segments.

Figure 5:
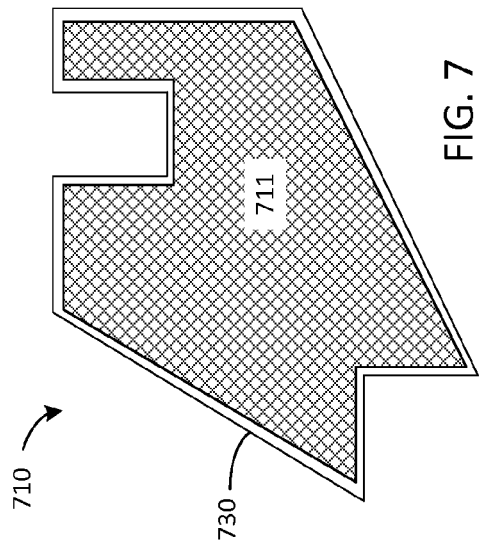

FIG. 5 is a radial cross-sectional elevational view of a transition support ring 510. Transition support ring 510 comprises annular body 511 having an outward facing surface 512, an inward facing surface 513, a lower surface 514 and an upper surface 515. The outward facing surface 512 includes a vertical portion 512a and an angled portion 512b that extends upwardly and inwardly from the vertical portion 512a when viewed in radial cross-section as shown in FIG. 5. The inward facing surface 513 includes a vertical portion 513a and an angled portion 513b that flares downwardly from the vertical portion 513a when viewed in radial cross-section as shown in FIG. 5. The lower surface 514 comprises a ceiling surface 524a and at least one side surface 524b that together define a downwardly opening hollow 524. In the embodiment of FIG. 5, the lower surface 514 further comprises a second side surface 524c, and the downwardly opening hollow 524 is a downwardly opening annular channel or groove defined by ceiling surface 524a and side surfaces 524b, 524c. The upper surface 515 comprises a floor surface or seat 525a and at least one side surface 525b that together define an upwardly opening hollow 525. In the embodiment of FIG. 5, upper surface 515 further comprises a second side surface 525c, and the upwardly opening hollow 525 is an upwardly opening annular channel or groove defined by floor surface 525a and side surfaces 525b, 525c. The downwardly opening hollow 524 is spaced radially from the upwardly opening hollow 525. In particular, side surface 524b is spaced radially from side surface 525c. The ceiling surface 524a of the downwardly opening hollow 524 and floor surface 525a of the upwardly opening hollow 525 are generally horizontal, when the transition support ring 510 is positioned between two vertically stacked liner segments (not shown). In some embodiments, the side surfaces 524b and 525b of the downwardly and upwardly opening hollows 524, 525 are parallel, or substantially parallel, to one another when viewed in radial cross-section as shown in FIG. 5. In certain arrangements, the side surfaces 524b, 524c, 525b, 525c are vertical, or substantially vertical, when the transition support ring 510 is positioned between two vertically stacked liner segments. In one embodiment, the angled portion 512b of the outward facing surface 512 is parallel to the angled portion 513b of the inward facing surface 513 when viewed in radial cross-section as shown in FIG. 5. In another embodiment, the angled portion 512b of the outward facing surface 512 is not parallel to the angled portion 513b of the inward facing surface 513 when viewed in radial cross-section as shown in FIG. 5.

Figure 6:
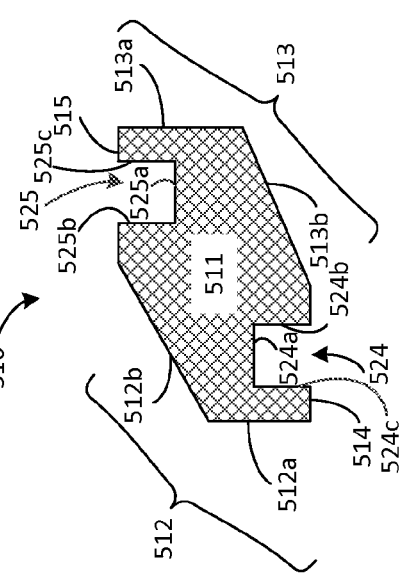

FIG. 6 is a radial cross-sectional elevational view of a transition support ring 610. Transition support ring 610 comprises an annular body 611 having an outward facing surface 612, an inward facing surface 613, a lower edge surface 614, and an upper surface 615 that is the surface of a ledge. The lower surface 614 comprises a ceiling surface 624a and at least one side surface 624b that together define a downwardly opening hollow 624 that is an annular rabbet. The upper surface 615 comprises a floor surface or seat 625a and at least one side surface 625b that together define an upwardly opening hollow 625 that is an annular rabbet. The downwardly opening hollow 624 is spaced radially from the upwardly opening hollow 625. In particular, side surface 624b is spaced radially from the location where inward facing surface 613 joins upper surface 615. The ceiling surface 624a of the downwardly opening hollow 624 and floor surface 625a of the upwardly opening hollow 625 are generally horizontal, when the transition support ring 610 is positioned between two vertically stacked liner segments (not shown). In some embodiments, the side surfaces 624b and 625b of the upwardly and downwardly opening hollows 624, 625 are parallel, or substantially parallel, to one another when viewed in radial cross-section as shown in FIG. 6. In certain arrangements, the side surfaces 624b, 625b are vertical, or substantially vertical, when the transition support ring 610 is positioned between two vertically stacked liner segments.

With reference to FIG. 3A, liner segments 82, 84 may be adhesively secured within downwardly opening hollow 124 and upwardly opening hollow 125, respectively. A quantity of bonding material may be placed on the floor surface or seat 125a of upwardly opening hollow 125 before liner segment 84 is received within the hollow. Similarly, a quantity of bonding material may be placed on the ceiling surface or ledge 124a of downwardly opening hollow 124 before liner segment 82 is received within the hollow. Alternatively, a quantity of bonding material may be applied to an upper surface 82a of liner segment 82 before the liner segment is received within the downwardly opening hollow 124. In one embodiment, the upper surface 82a of liner segment 82 defines an upwardly opening annular groove or channel 82d in which the quantity of bonding material is applied before the liner segment 82 is placed into the downwardly opening hollow 124. The bonding material selection depends at least in part on the materials from which the transition support ring 110 and liner segments 82, 84 are constructed. For example, when the support ring has an outer surface comprising a ceramic material (e.g., SiC) and the liner segments also are constructed of a ceramic material, the bonding material may comprise lithium aluminum silicate and silicon carbide, such as 0.4-0.7 wt % lithium and 93-97 wt % silicon carbide.

IV. Transition Support Ring Materials and Protective Layers

A. Materials

The transition support ring can be constructed from any suitable material that can tolerate the conditions within reactor 10 and is well-suited to the high temperatures utilized to transfer heat into the fluid bed. The transition support ring may be of different material than the reactor vessel and/or the liner segments. In some embodiments, the transition support ring is constructed of the same material as at least one of the liner segments. The transition support ring is constructed from, and/or coated with, materials that will not contaminate the silicon product particles and are suitable for tolerating the temperature gradients associated with heating the fluid bed and cooling the product.

Suitable materials include, but are not limited to, metals, high-temperature metal alloys, ceramic materials such as silicon carbide (SiC), silicon nitride ($Si_3N_4$) and reaction-bonded (siliconized) silicon carbide (RBSiC, Si—SiC), and ceramic matrix composites (e.g., alumina fibers coated with SiC, $Si_3N_4$, or RBSiC).

Suitable metals and alloys include, but are not limited to, high-temperature steels, e.g., 304H or 304L stainless steel, certain nickel (e.g., iron-nickel, nickel-chromium, or iron-chromium-nickel-molybdenum) or cobalt alloys, or nickel-based or cobalt-based superalloys (an alloy having a face-centered cubic crystal structure, and suitable for use at temperatures above 540° C. (1000° F.)).

Stainless steel 304H comprises 0.04-0.1 wt % carbon, up to 2 wt % manganese, up to 0.045 wt % phosphorus, up to 0.03 wt % sulfur, up to 0.75 wt % silicon, 18-20 wt % chromium, 8-10.5 wt % nickel, up to 0.1 wt % nitrogen, with the balance (~66.5-74 wt % being iron.

Stainless steel 304L comprises up to 0.03 wt % carbon, up to 2 wt % manganese, up to 0.045 wt % phosphorus, up to 0.03 wt % sulfur, up to 0.75 wt % silicon, 18-20 wt % chromium, 8-12 wt % nickel, up to 0.1 wt % nitrogen, with the balance (~65-74 wt %) being iron.

Incoloy® 800H is a nickel-iron-chromium alloy comprising 30-35 wt % nickel/cobalt (up to 2 wt % cobalt), 19-23 wt % chromium, up to 1 wt % silicon, up to 1.5 wt % manganese, 0.05-0.1 wt % carbon, 0.15-0.6 wt % aluminum, 0.15-0.6 wt % titanium, up to 0.015 wt % sulfur, with the balance (~38-51 wt %) being iron (available from Special Metals Corporation, New Hartford, N.Y.).

Incoloy® A-286 is an iron-nickel-chromium alloy with additions of molybdenum and titanium, having a composition comprising 24-27 wt % Ni, 13.5-16 wt % Cr, 1.9-2.35 wt % Ti, 1-1.5 wt % Mo, 0.1-0.5 wt % V, ≤0.08 wt % C, ≤2 wt % Mn, ≤1 wt % Si, ≤0.35 wt % Al, ≤0.03 wt % S, 0.001-0.01 wt % B, with the balance (~49-59.5 wt %) being iron (available from Special Metals Corporation, New Hartford, N.Y.).

Inconel® 718 is a nickel-based superalloy having a composition comprising 50-55 wt % Ni/Co (maximum 1 wt % cobalt), 17-21 wt % Cr, 4.75-5.50 wt % Nb (plus tantalum), 2.8-3.3 wt % Mo, 0.65-1.15 wt % Ti, 0.2-0.8 wt % Al, ≤1 wt % Co, ≤0.08 wt % C, ≤0.35 wt % Mn, ≤0.35 wt % Si, ≤0.015 wt % P, ≤0.015 wt % S, ≤0.006 wt % B, ≤0.3 wt % Cu, with the balance being iron (available from Special Metals Corporation, New Hartford, N.Y.).

Inconel® X-750 is a nickel-based superalloy having a composition comprising at least 70 wt % Ni/Co (maximum 1 wt % cobalt), 14-17 wt % Cr, 5-9 wt % Fe, 2.25-2.75 wt % Ti, 0.4-1 wt % Al, 0.7-1.2 wt % Nb (plus tantalum), ≤1 wt % Mn, ≤0.5 wt % Si, ≤0.01 wt % S, ≤0.5 wt % Cu, ≤0.08 wt % C, ≤1 wt % Co (available from Special Metals Corporation, New Hartford, N.Y.).

Haynes® 25 is a cobalt-based superalloy comprising 51 wt % Co, 10 wt % Ni, ≤3 wt % Fe, 20 wt % Cr, 15 wt % W, 1.5 wt % Mn, ≤0.4 wt % Si, and 0.1 wt % C (available from Haynes International, Inc., Kokomo, Ind.).

Ultimet® alloy is a cobalt superalloy having a composition comprising 26 wt % Cr, 9 wt % Ni, 5 wt % Mo, 3 wt % Fe, and 2 wt % W, with the balance (~55 wt %) being cobalt (available from Haynes International, Inc., Kokomo, Ind.).

Haynes® 242® alloy is a nickel-based superalloy having a composition comprising 24-26 wt % Mo, 7-9 wt % Cr, 2.5 wt % Co, ≤0.8 wt % Mn, ≤0.8 wt % Si, ≤0.5 wt % Al, ≤0.5 wt % Cu, ≤0.03 wt % C, and ≤0.006 wt % B, with the balance (~65 wt %) being nickel (available from Haynes International, Inc., Kokomo, Ind.).

Haynes® 282® alloy is a nickel-based superalloy having a nominal composition comprising 8.5 wt % Mo, 20 wt % Cr, 10 wt % Co, ≤0.3 wt % Mn, ≤0.15 wt % Si, 1.5 wt % Al, ≤1.5 wt % Fe, 0.06 wt % C, and 0.005 wt % B, with the balance (~57 wt %) being nickel (available from Haynes International, Inc., Kokomo, Ind.).

Haynes® Waspaloy alloy is a nickel-based superalloy having a composition comprising 18-21 wt % Cr, 12-15 wt % Co, 3.5-5 wt % Mo, 2.75-3.25 wt % Ti, 1.2-1.6 wt % Al, 0.03-0.1 wt % C, 0.02-0.08 wt % Zr, 0.003-0.01 wt % B, ≤2 wt % Fe, ≤0.15 wt % Si, ≤0.1 wt % Cu, ≤0.1 wt % Mn, ≤0.015 wt % P, and ≤0.015 wt % S, with the balance being nickel (available from Haynes International, Inc., Kokomo, Ind.).

Udimet® L-605 alloy is a cobalt-based superalloy comprising 0.05-0.15 wt % C, 1-2 wt % Mn, ≤0.4 wt % Si, 19-21 wt % Cr, 9-11 wt % Ni, 14-16 wt % W, ≤0.04 wt % P, ≤0.03 wt % S, ≤3 wt % Fe, with the balance being cobalt (available from Special Metals Corporation, New Hartford, N.Y.).

Udimet® 520 alloy is a nickel-based superalloy comprising 0.02-0.06 wt % C, 18-20 wt % Cr, 11-14 wt % Co, 5.5-7 wt % Mo, 2.9-3.25 wt % Ti, 1.8-2.3 wt % Al, 0.8-1.2 wt % W, 0.004-0.010 wt % B, with the balance being nickel (available from Special Metals Corporation, New Hartford, N.Y.).

Udimet® 720 alloy is a nickel-chromium alloy comprising 15.5-16.5 wt % Cr, 14-15.5 wt % Co, 2.75-3.25 wt % Mo, 1-1.5 wt % W, 4.75-5.25 wt % Ti, 2.25-2.75 wt % Al, 0.01-0.02 wt % C, 0.025-0.05 wt % Zr, 0.01-0.02 wt % boron, with the balance (~55.2-59.7 wt %) being nickel (available from Special Metals Corporation, New Hartford, N.Y.).

Udimet® R41 is a nickel-chromium alloy comprising 18-20 wt % Cr, 10-12 wt % Co, 9-10.5 wt % Mo, 1.4-1.8 wt % Al, 3-3.3 wt % Ti, ≤5 wt % Fe, 0.003-0.01 wt % B, ≤0.12 wt % C, with the balance (~47.4-58.6 wt %) being nickel (available from Special Metals Corporation, New Hartford, N.Y.).

Udimet® 188 alloy is a cobalt-based alloy comprising 0.05-0.15 wt % C, ≤1.25 wt % Mn, 0.2-0.5 wt % Si, 20-24 wt % Cr, 20-24 wt % Ni, 13-16 wt % W, 0.02-0.12 wt % La, ≤0.015 wt % B, ≤3 wt % Fe, with the balance (~31-46.7 wt %) being cobalt (available from Special Metals Corporation, New Hartford, N.Y.).

Udimet® D-979 alloy is an iron-nickel alloy comprising 14-16 wt % Cr, 3-4.5 wt % Mo, 3-4.5 wt % W, 2.7-3.3 wt % Ti, 0.75-1.3 wt % Al, 42-48 wt % Ni, ≤0.08 wt % C, ≤0.75 wt % Si, ≤0.75 wt % Mn, 0.008-0.016 wt % B, with the balance (~20.8-34.5 wt %) being iron (available from Special Metals Corporation, New Hartford, N.Y.).

In some embodiments, the transition support ring is constructed of silicon carbide. Silicon carbide transition support rings for fluidized bed reactors advantageously are constructed from SiC that does not cause significant product contamination when the SiC liner is exposed to operating conditions of the FBR. In some embodiments, at least a portion of a transition support ring is constructed from reaction-bonded SiC (RBSiC).

RBSiC advantageously has surface contamination levels of less than 3% atomic of dopants and less than 5% atomic of foreign metals. Dopants in RBSiC include B, Al, Ga, Be, Sc, N, P, As, Ti, Cr, or any combination thereof. In some embodiments, the portion has a surface contamination level of less than 3% atomic of dopants B, Al, Ga, Be, Sc, N, P, As, Ti, and Cr, combined. The inwardly facing surface of a transition support ring constructed of RBSiC advantageously has a surface contamination level comprising less than 1% atomic of phosphorus and less than 1% atomic of boron.

The RBSiC desirably has a mobile metal concentration sufficiently low that the polysilicon-coated granulate material produced in the fluidized bed reactor has a mobile metal contamination level of ≤1 ppbw as measured by inductively coupled plasma mass spectroscopy (ICPMS) and based on the entire mass of the granule. For aluminum, a contamination level of 1 ppbw or greater might result when aluminum is present in the RBSiC at a sufficient concentration that an aluminum partial pressure in the FBR is at least 1 Pa, e.g., at least 1 Pa at operating conditions within the FBR. For heavier elements (e.g., Fe, Cr), undesirable product contamination levels may occur at lower partial pressures. In some embodiments, the RBSiC has a mobile metal concentration sufficiently low that a total mobile metal partial pressure in the FBR is less than 0.1 Pa for the sum of all mobile metal partial pressures during operation of the FBR. The mobile metals include aluminum, chromium, iron, copper, magnesium, calcium, sodium, nickel, tin, zinc, and molybdenum. Partial pressure is calculated based on the contamination level measured by ICPMS in the granulate material. Vapor pressures of metals can be estimated by the Antoine equation:

$$\log p(\text{atm}) = A + B \times T^{-1} + C \times \log(T) + D \times T \times 10^{-3},$$

where p is metal vapor pressure (atm), T is temperature in Kelvins, A, B, C, and D are component-specific constants (Alcock, *Thermochemical Processes Principles and Models*, Butterworth-Heinemann, 2001, p. 38). The calculation assumes that all the vapors of the particular impurity are incorporated into the granulate material. The impurity vapors may be assumed to obey the ideal gas law. Moles or mass of the impurity in the reactor is calculated with the ideal gas law. A concentration in the granulate material is then calculated using the total mass of granulate material in the FBR.

In some arrangements, the RBSiC is siliconized SiC produced by exposing a finely divided mixture of silicon carbide and carbon particles to liquid or vaporized silicon at high temperatures. In certain embodiments, the liquid or vaporized silicon is solar-grade or electronic-grade silicon.

Because components within a fluid bed reactor undergo large temperature changes, the material of the transition support ring has a linear coefficient of thermal expansion that is similar to a linear coefficient of thermal expansion of the liner segments. In some embodiments, the linear coefficient of thermal expansion (LCTE) of the transition support ring and the LCTE of the liner segments differ by ≤30%, advantageously by ≤20%, ≤10%, or even ≤5%.

Figure 7:
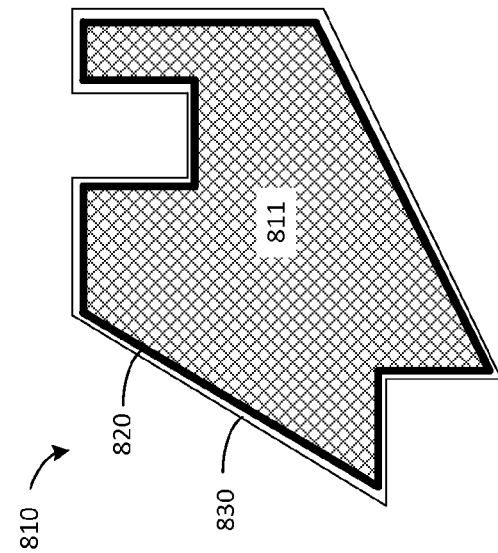
FIG. 7 is a schematic radial cross-sectional elevational view of an exemplary transition support ring coated with an outer protective layer.

B. Outer Protective Layer In some embodiments, a transition support ring 710 comprises an annular body 711 constructed of a metal, metal alloy, ceramic material or ceramic matrix composite. The body 711 may be coated with an outer protective layer 730 suitable for withstanding reactor conditions and/or reducing product contamination (FIG. 7). A transition support ring comprising stainless steel 304H or Incoloy® 800H alloy, for example, may be coated with a protective layer. At least a portion of the exposed surface of the transition support ring (i.e., the surface exposed to silicon-coated particles during reactor operation) is coated with an embodiment of the disclosed protective layers. In some embodiments, the exposed surface is completely, or substantially completely, coated with the protective layer. For example, at least 95%, at least 97% or at least 99% of the exposed surface may be coated with the protective layer. In some embodiments, the protective layer has a minimum average thickness of 0.1 mm, and/or an average thickness from 0.1 mm to 1 mm, such as from 0.1 mm to 0.7 mm or from 0.25 mm to 0.5 mm.

In some embodiments, the protective layer has an ultimate tensile strength of at least 700 MPa at 650° C., advantageously an ultimate tensile strength of at least 800 MPa, at least 900 MPa, or at least 1000 MPa at 650° C. Ultimate tensile strength (the maximum engineering stress a material withstands during a tensile test, e.g., the peak value on the material's stress/strain curve) can be determined using a tensile testing machine (e.g., Instron®, Norwood, Mass.). Suitable methods for testing ultimate tensile strength of metals include ASTM (American Society of Testing and Materials) E8 and ASTM A370.

Because components within a fluid bed reactor undergo large temperature changes, the underlying material of the annular body 711 has a linear coefficient of thermal expansion (LCTE-1) that is similar to a linear coefficient of thermal expansion of the protective layer 730 (LCTE-2). In some embodiments, LCTE-2 and LCTE-1 differ by ≤30%, advantageously by ≤20% or ≤10%. For example, when the underlying material is 304H steel (LCTE=18.6×10⁻⁶/K) or 800H steel (LCTE=16.9×10⁻⁶/K), the protective layer may have a LCTE from 11.8×10⁻⁶/K (i.e., LCTE-1×0.7) to 24.2×10⁻⁶/K (i.e., LCTE-1÷0.7), advantageously a LCTE from 13.5× 10⁻⁶/K to 22.3×10⁻⁶/K. Generally, a protective layer with sufficient hardness to withstand reactor conditions will have a LCTE that is less than or equal to the underlying material's LCTE.

Figure 8:
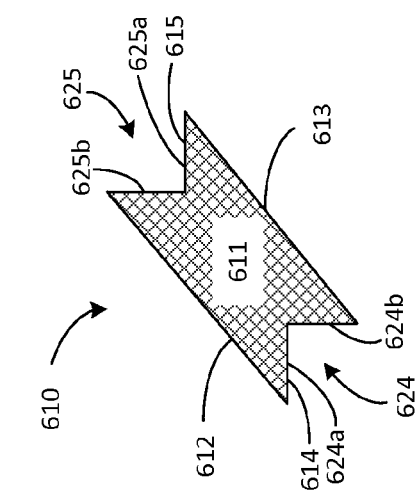
FIG. 8 is a schematic radial cross-sectional elevational view of an exemplary transition support ring coated with an intermediate bonding or adhesion promoter coating and an outer protective layer.

In some embodiments, an intermediate bonding or adhesion promoter coating is applied to the transition support ring prior to application of the protective layer. For example, as shown in FIG. 8, the surface of a transition support ring 810 comprising an annular body 811 may be coated with an intermediate bonding or adhesion promoter coating 820 and an outer protective layer 830. Advantageously, the intermediate coating has a linear coefficient of thermal expansion (LCTE-3) that is between LCTE-1 and LCTE-2. The intermediate coating may increase durability of the protective layer by reducing or preventing delamination of the protective layer from the underlying reactor component during fluidized bed reactor operation. In one embodiment, the intermediate coating is a nickel-chromium alloy.

Suitable protective layer materials include certain cobalt-based and nickel-based alloys and superalloys, silicon carbide, tungsten carbide (WC), silicon nitride, and combinations thereof. In certain embodiments, the suitable protective layer is a cobalt-based alloy or superalloy, a nickel-based alloy or superalloy, or any combination thereof.

Desirably, the protective layer does not release (e.g., through erosion or diffusion), under the operating conditions of the fluidized bed reactor, substantial amounts of metals that can contaminate the product particles. When producing silicon-coated particles, it is undesirable to have product contamination (e.g., at the parts per thousand level) by electron donors and/or electron acceptors, such as aluminum, arsenic, boron, or phosphorus. In some embodiments, the protective layer has a sufficient hardness and/or erosion resistance under the reactor operating conditions to minimize or prevent release of aluminum, arsenic, boron, or phosphorus from the protective layer. In certain embodiments, the protective layer material does not comprise aluminum, arsenic, boron, or phosphorus or, alternatively, does not comprise more than a trace amount of (e.g., ≤2% or ≤1%) aluminum, arsenic, boron, or phosphorus.

In some embodiments, the protective layer material is a cobalt-based alloy comprising 25-35% Cr, ≤10% W, ≤10% Ni, ≤5% Mo, ≤3% Fe, ≤2% Si, ≤2% C, ≤1.5% Mn, ≤1% B, ≤0.05% P, and ≤0.05% S, with the balance (30.5-75%) being cobalt.

In some embodiments, the protective layer material is a nickel-based alloy having a composition comprising 4-30% Mo, 5-25% Cr, 2-15% Co, ≤2% Fe, ≤3.5% Ti, ≤2% Al, ≤1% Mn, ≤1% Si, ≤0.5% Cu, ≤0.1% C, ≤0.1% Zr, and ≤0.01% B, with the balance (23.4-89%) being nickel.

In one embodiment, the protective layer material is a cobalt alloy having a composition comprising 26-33% Cr, 7-9.5% W, ≤7% Ni, ≤2.5% Fe, ≤2% Si, 1.1-1.9% C, 0.5-1.5% Mn, 0.1-1.5% Mo, ≤1% B, ≤0.03% P, and ≤0.03% S, with the balance (~60%) being cobalt (e.g., Stellite® 12 alloy, available from Kennametal Stellite, Goshen, Ind.).

In other embodiments, the protective layer material comprises a superalloy such as an Ultimet®, Haynes® 282®, Haynes® 242®, or Haynes® Waspaloy alloy as described supra.

V. Segmented Liners

A. Stacked Segments

An exemplary segmented liner 80 for use in a fluidized bed reactor for production of polysilicon-coated granulate material comprises a first segment 82, a second segment 84 stacked on top of the first segment 82, and a transition support ring 110 disposed between the upper edge surface of the first segment 82 and the second segment 84 (FIG. 2A). The first segment 82 has a cross-sectional dimension, or inner cross-sectional dimension, ID1 larger than the cross-sectional dimension, or inner cross-sectional dimension, ID2 of the second segment 84.

In some arrangements, such as the exemplary liner 80 of FIGS. 1 and 2B, the liner may include three vertically stacked segments 82, 84, 86. A transition support ring 110 is positioned between adjacent segments of differing inner cross-sectional dimensions. If the horizontal cross-section of the top of segment 82 is a mirror image of the horizontal cross-section of the bottom of segment 86, two identical rings 110 can be used with one of the rings being inverted relative to the other. A person of ordinary skill in the art understands that the segmented liner may include two, three, four, or more than four vertically stacked segments with transition support rings between each adjacent pair of liner segments that have differing inner cross-sectional dimensions.

If two adjacent segments have the same, or substantially the same, inner and outer cross-sectional dimensions, a transition support ring need not be used between the segments. In such instances, the liner segments can be joined by any suitable means, e.g., welding, adhesion, etc. For example, vertically stacked silicon carbide segments having the same, or substantially the same, cross-sectional dimension may be adhered to one another with a bonding material. The cured bonding material may comprise lithium aluminum silicate and silicon carbide, such as 0.4-0.7 wt % lithium and 93-97 wt % silicon carbide. In some embodiments, the cured bonding material has sufficient strength to provide joints that can withstand a mass load of at least 5 kg. The bonding material may further comprise aluminum silicate. The bonding material, prior to curing, may be an aqueous slurry comprising 2500-5000 ppm lithium as lithium silicate, 700-2000 ppm aluminum as aluminum silicate, and silicon carbide particles. The slurry has a viscosity from 3.5 Pa·s to 21 Pa·s at 20° C. In certain embodiments, the bonding material is an aqueous slurry comprising 3000-4000 ppm lithium as lithium silicate, 1000-1500 ppm aluminum as aluminum silicate, and silicon carbide powders.

B. Laterally Joined Segment Portions

Figure 9:
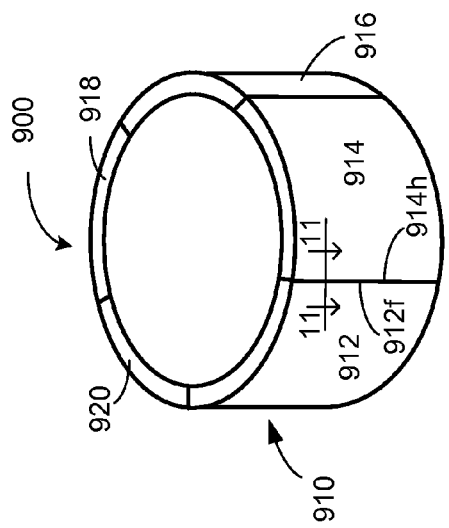
FIG. 9 is a schematic oblique view of a liner segment including plural laterally joined segment portions.

A liner segment 900 for use in a fluidized bed reactor for production of polysilicon-coated granulate material may include at least one tubular wall 910 having an annular outer surface and comprising a plurality of laterally joined segment portions 912, 914, 916, 918, 920 (FIG. 9). Each segment portion has lateral edges and an outer surface that defines a portion of the outer surface of the tubular wall 910. A volume of bonding material is disposed between abutting lateral edge surfaces of each pair of adjacent segments. A person of ordinary skill in the art understands that the liner segment 900 may include more or fewer laterally joined segment portions than shown in FIG. 9. It may be preferable to use fewer segment portions to reduce contamination from bonding material used to join the segment portions. However, the number of segment portions also may be determined in part by handling ease when assembling the liner.

Figure 10:
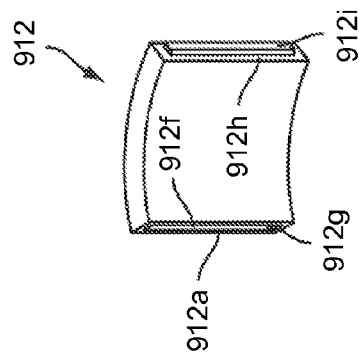
FIG. 10 is a schematic oblique view of one segment portion of a liner segment that includes plural laterally joined segment portions.

As shown in FIG. 10, each segment portion, e.g., exemplary segment portion 912, comprises (i) an outer surface 912a defining a portion of the annular outer surface of the tubular wall 910, (ii) a first lateral edge surface 912f defining a laterally opening depression 912g along at least a portion of the length of the first lateral edge surface 912f, and (iii) a second lateral edge surface 912h defining a laterally extending protrusion 912i along at least a portion of the length of the second lateral edge surface 912h. In some embodiments, the depression 912g and protrusion 912i extend along the entire length of the first lateral edge surface 912f and second lateral edge surface 912i, respectively. The depression 912g and the protrusion 912i are female and male joint portions, respectively. In some examples, the joint portions have a tongue-and-groove configuration, wherein the depression 912g corresponds to the groove and the protrusion 912i corresponds to the tongue.

Figure 11:
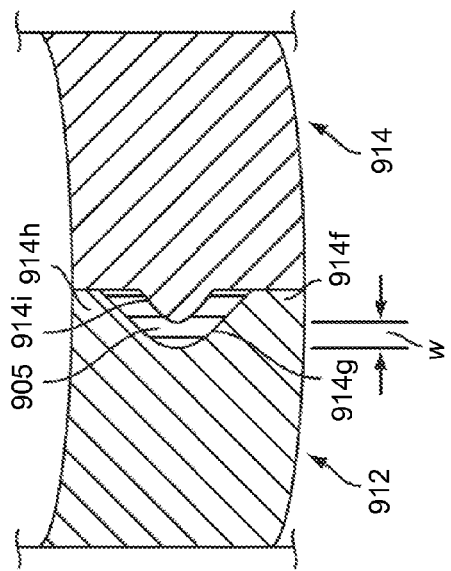
FIG. 11 is schematic partial cross-sectional view, taken along line 11-11 of FIG. 9, showing the boundary between two laterally abutted segment portions.

The second lateral edge protrusion 912i of each segment portion has smaller edge dimensions than the first lateral edge surface depression 912g of each segment portion. Accordingly, with reference to FIG. 11, when a first lateral edge 912f of a first segment portion 912 is abutted to a second lateral edge 914h of an adjacent segment portion 214, the surface of the first segment portion depression 912g is spaced apart from the surface of the adjacent segment portion protrusion 914i and a space is located between the first segment portion depression 912g and the adjacent segment portion protrusion 914i. A volume of bonding material 905 is disposed within the space between the first segment portion depression 912g and the adjacent segment portion protrusion 914i. In some examples, the space has a width w, measured horizontally, of 0.2-0.8 mm, such as a width of 0.4-0.6 mm. The bonding material 905 is disposed within the space between the first segment portion depression 912g and the second segment portion protrusion 914i.

In some embodiments, a liner segment comprises a plurality of alternating SiC segment portions having laterally opening depressions on both lateral edge surfaces and segment portions having laterally extending protrusions on both lateral edge surfaces. In other words, segment portion 912, for example, may have a first lateral edge 912f defining a laterally opening depression 912g and a second lateral edge 912h defining a laterally opening depression 912i. Alternate segment portions, e.g., segment portion 914, may have a first lateral edge 914f defining a laterally extending protrusion 912g and a second lateral edge 914h defining a laterally extending protrusion 914i.

In some embodiments, the liner segment portions are constructed of silicon carbide and the cured bonding material may comprise lithium aluminum silicate and silicon carbide, such as 0.4-0.7 wt % lithium and 93-97 wt % silicon carbide. In some embodiments, the cured bonding material has sufficient strength to provide joints that can withstand a mass load of at least 5 kg. The bonding material may further comprise aluminum silicate. The bonding material, prior to curing, may be an aqueous slurry comprising 2500-5000 ppm lithium as lithium silicate, 700-2000 ppm aluminum as aluminum silicate, and silicon carbide particles. The slurry has a viscosity from 3.5 Pa·s to 21 Pa·s at 20° C. In certain embodiments, the bonding material is an aqueous slurry comprising 3000-4000 ppm lithium as lithium silicate, 1000-1500 ppm aluminum as aluminum silicate, and silicon carbide powders.

Figure 12:
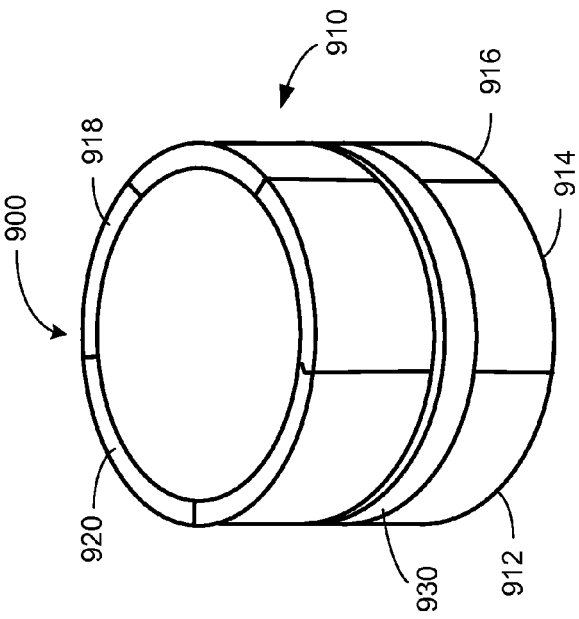
FIG. 12 is a schematic oblique view of a liner segment including laterally abutted segment portions and an encompassing retaining element.

In some embodiments, at least one retaining member 930 extends around the annular outer surface of the tubular wall 910 (FIG. 12). Desirably, the retaining member 930 is constructed of a material having a linear coefficient of thermal expansion (LCTE) substantially similar to the LCTE of the liner segment material. If the LCTE values of the retaining member and the liner segment material are significantly different, the retaining member 930 and the liner segment 900 will have different magnitudes of expansion under operating conditions of the fluidized bed reactor, thereby potentially rendering the retaining member ineffective or fracturing the liner segment. In some embodiments, the liner segment 900 is constructed of SiC liner segment portions. The LCTE of SiC is $3.9-4.0\times10^{-6}$/K. In some examples, the retaining member is constructed of a material having a LCTE ranging from $2\times10^{-6}$/K to $6\times10^{-6}$/K, such as a LCTE ranging from $3\times10^{-6}$/K to $5\times10^{-6}$/K or from $3.5\times10^{-6}$/K to $5\times10^{-6}$/K. Suitable materials for the retaining member include, but are not limited to, molybdenum (LCTE=$4.9\times10^{-6}$/K) and certain molybdenum alloys (e.g., TZM molybdenum –99.2-99.5 wt % Mo, 0.5 wt % Ti, and 0.08 wt % Zr).

VI. Liner Materials

Suitable materials for the liner segments and segment portions include, but are not limited to, ceramics (e.g., silicon carbide, reaction-bonded silicon carbide, silicon nitride), graphite, quartz, and stainless steel alloys, such as martensitic stainless steel alloys. Segments of a liner may be constructed of the same material or different materials. As one non-limiting example, with reference to FIG. 1, liner segment 82 may be constructed of a martensitic stainless steel alloy and liner segment 84 may be constructed of silicon carbide.

In some embodiments, one or more liner segments or segment portions are constructed of silicon carbide. Silicon carbide liner segments and segment portions for fluidized bed reactors advantageously are constructed from SiC that does not cause significant product contamination when the SiC liner is exposed to operating conditions of the FBR. In some embodiments, at least a portion of a liner segment is constructed from reaction-bonded SiC (RBSiC).

An inwardly facing surface of the portion of the liner segment comprising RBSiC advantageously has surface contamination levels of less than 3% atomic of dopants and less than 5% atomic of foreign metals. Dopants in RBSiC include B, Al, Ga, Be, Sc, N, P, As, Ti, Cr, or any combination thereof. In some embodiments, the portion has a surface contamination level of less than 3% atomic of dopants B, Al, Ga, Be, Sc, N, P, As, Ti, and Cr, combined. The inwardly facing surface of the liner segment portion constructed of RBSiC advantageously has a surface contamination level comprising less than 1% atomic of phosphorus and less than 1% atomic of boron.

The RBSiC desirably has a mobile metal concentration sufficiently low that the polysilicon-coated granulate material produced in the fluidized bed reactor has a mobile metal contamination level of ≤1 ppbw as measured by inductively coupled plasma mass spectroscopy (ICPMS) and based on the entire mass of the granule. In some embodiments, the RBSiC has a mobile metal concentration sufficiently low that a total mobile metal partial pressure in the FBR is less than 0.1 Pa for the sum of all mobile metal partial pressures during operation of the FBR. The mobile metals include aluminum, chromium, iron, copper, magnesium, calcium, sodium, nickel, tin, zinc, and molybdenum. Partial pressure is calculated based on the contamination level measured by ICPMS in the granulate material as described supra.

In some arrangements, the RBSiC is siliconized SiC produced by exposing a finely divided mixture of silicon carbide and carbon particles to liquid or vaporized silicon at high temperatures. In certain embodiments, the liquid or vaporized silicon is solar-grade or electronic-grade silicon.

In some embodiments, one or more liner segments or segment portions are constructed of a martensitic stainless steel alloy. The martensitic stainless steel alloy comprises less than 20% (w/w) chromium, such as 11-18% (w/w) chromium, and less than 6% (w/w) nickel. In some embodiments, the stainless steel alloy comprises less than 3% (w/w) nickel, such as less than 1% (w/w) nickel, less than 0.8% (w/w) nickel, less than 0.5% (w/w) nickel, or substantially no nickel. In certain embodiments, the stainless steel alloy does not comprise copper and/or selenium.

In one embodiment, the stainless steel alloy comprises 11.5-13.5% (w/w) chromium and 0.7-0.8% (w/w) nickel. In another embodiment, the alloy comprises 12-14% (w/w) chromium and less than 0.5% (w/w) nickel. In either of these embodiments, the alloy may further comprise ≤0.15% (w/w) carbon, ≤1% (w/w) silicon, ≤1% (w/w) manganese, ≤0.04% (w/w) phosphorus, and ≤0.03% (w/w) sulfur.

In yet another embodiment, the stainless steel alloy comprises 16-18% (w/w) chromium. The alloy may further comprise 0.5-1.5% (w/w) carbon, ≤1% (w/w) silicon, ≤1% (w/w) manganese, ≤0.04% (w/w), phosphorus, and ≤0.03% (w/w) sulfur.

In some embodiments, a liner segment or segment portion is prepared by machining a body of a stainless steel alloy, and then hardening the machined liner segment or segment portion by heat treatment. For example, the alloy may be heated to a temperature from 900-1100° C. for an effective period of time, and then quenched (i.e., quickly cooled) in air, water, or oil. Optionally, the alloy is tempered after hardening to reduce its brittleness.

In some embodiments, the liner segment or segment portion comprises a stainless steel alloy having a mean coefficient of thermal expansion less than $15\times10^{-6}$/K over a temperature range from 273 K-588 K (0° C.-315° C.), such as from $9.9\times10^{-6}$/K to $11.5\times10^{-6}$/K. In one embodiment, the stainless steel alloy has a mean coefficient of thermal expansion from $10.0\times10^{-6}$/K to $10.2\times10^{-6}$/K. In another embodiment, the stainless steel alloy has a mean coefficient of thermal expansion from $10.7\times10^{-6}$ m/m·° C. to $10.9\times10^{-6}$/K. In yet another embodiment, the stainless steel alloy has a mean coefficient of thermal expansion from $11.3\times10^{-6}$ m/m·° C. to $11.5\times10^{-6}$/K.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims.

The invention claimed is:

1. A transition support ring for a segmented liner for use in a fluidized bed reactor for production of polysilicon-coated granulate material, the transition support ring comprising an annular body having a surface that defines:
   an upwardly opening annular hollow that is sized and shaped to partially receive a segment of a liner of a fluidized bed reactor for production of polysilicon-coated granulate material; and
   a downwardly opening annular hollow that is sized and shaped to partially receive a segment of a liner of a fluidized bed reactor for production of polysilicon-coated granulate material, the upwardly opening annular hollow being spaced radially from the downwardly opening annular hollow such that the upwardly opening annular hollow and the downwardly opening annular hollow are capable of receiving liner segments having different inner cross-sectional dimensions.

2. The transition support ring of claim 1, wherein the surface comprises:
an upper surface that defines the upwardly opening annular hollow; and
a lower surface that defines the downwardly opening annular hollow.

3. The transition support ring of claim 2, wherein:
the upper surface includes a generally horizontal floor surface that partially defines the upwardly opening hollow and that is configured to support a liner segment; and
the lower surface includes generally horizontal ceiling surface that partially defines the downwardly opening hollow and that is configured to rest on a liner segment.

4. The transition support ring of claim 2, wherein:
the upper surface includes at least one side surface that partially defines the upwardly opening hollow; and
the lower surface includes at least one side surface that partially defines the downwardly opening hollow, with all of the side surfaces extending generally vertically, wherein the at least one side surface of the upper surface is spaced radially from the at least one side surface of the lower surface.

5. The transition support ring of claim 1, wherein the annular body comprises a metal, a metal alloy, a ceramic, or a ceramic matrix composite.

6. The transition support ring of claim 5, wherein the annular body comprises 304H or 304L stainless steel, a cobalt alloy, an iron-chromium-nickel-molybdenum alloy, an iron-nickel alloy, a nickel-chromium alloy, a nickel-based or cobalt-based superalloy, silicon carbide, silicon nitride, reaction-bonded silicon carbide, or a ceramic matrix composite.

7. The transition support ring of claim 5, wherein at least a portion of the surface of the annular body is coated with an outer protective layer comprising a cobalt-based alloy, a nickel-based alloy, a cobalt-based superalloy, a nickel-based superalloy, silicon carbide, silicon nitride, tungsten carbide, or a combination thereof.

8. The transition support ring of claim 7, wherein the outer protective layer has an ultimate tensile strength of at least 700 MPa at 650° C.

9. The transition support ring of claim 7, wherein the outer protective layer has a linear coefficient of thermal expansion that differs by ≤30% from a linear coefficient of thermal expansion of the ring.

10. The transition support ring of claim 7, further comprising an intermediate bonding layer disposed between the surface of the annular body and the outer protective layer.

11. The transition support ring of claim 5, wherein the ceramic matrix composite comprises SiC, $Si_3N_4$, reaction-bonded SiC, or internal fibers comprising alumina and an outer coating comprising SiC, $Si_3N_4$, or reaction-bonded SiC.

12. A tubular segmented liner, comprising:
a tubular first liner segment having an upper edge surface with a first inner cross-sectional dimension;
a tubular second liner segment vertically stacked on the first liner segment, the second liner segment having an upper edge surface and a lower edge surface, the lower edge surface having a second inner cross-sectional dimension that is different than the first inner cross-sectional dimension; and
a transition support ring according to claim 1 positioned between the upper edge surface of the first liner segment and the lower edge surface of the second liner segment.

13. The segmented liner of claim 12, wherein the first liner segment and the second liner segment are constructed of the same material.

14. The segmented liner of claim 12, wherein the first liner segment and the second liner segment are constructed of different materials.

15. The segmented liner of claim 12, further comprising:
a tubular third liner segment vertically stacked on the second liner segment, the third liner segment having a lower edge surface with a third inner cross-sectional dimension that is different than the second inner cross-sectional dimension; and
a second transition support ring according to any one of claims 1-11 positioned between the upper edge surface of the second liner segment and the lower edge surface of the third liner segment.

16. The segmented liner of claim 12, wherein the first and second liner segments independently have a linear coefficient of thermal expansion that differs by ≤30% from a linear coefficient of thermal expansion of the transition support ring.

17. The segmented liner of claim 12, wherein at least one of the first liner segment and the second liner segment comprises a plurality of laterally joined segment portions.

18. The segmented liner of claim 17, wherein the segment portions comprise silicon carbide, the segmented liner further comprising:
a cured bonding material disposed between adjacent segment portions, the cured bonding material comprising 0.4-0.7 wt % lithium as lithium aluminum silicate and 93-97 wt % silicon carbide.

19. A fluidized bed reactor for production of polysilicon-coated granulate material, comprising:
a vessel having an outer wall; and
a tubular segmented liner comprising
a tubular first liner segment having an upper edge surface with a first inner cross-sectional dimension,
a tubular second liner segment vertically stacked on the first liner segment, the second liner segment having a lower edge surface with a second inner cross-sectional dimension that is different than the first inner cross-sectional dimension, and
a transition support ring according to claim 1 positioned between the upper edge surface of the first liner segment and the lower edge surface of the second liner segment, the liner being positioned inwardly of the outer wall such that the inner surfaces of the liner segments define a portion of a reaction chamber.

20. The fluidized bed reactor of claim 19, further comprising:
at least one heater positioned between the outer wall and the tubular segmented liner;
at least one inlet having an opening positioned to admit a primary gas comprising a silicon-bearing gas into the reaction chamber;
a plurality of fluidization gas inlets, wherein each fluidization gas inlet has an outlet opening into the reaction chamber; and
at least one outlet for removing silicon-coated product particles from the vessel.

* * * * *